United States Patent
Xu et al.

(10) Patent No.: US 12,508,215 B2
(45) Date of Patent: Dec. 30, 2025

(54) METHOD TO INCORPORATE OLEANOLIC ACID INTO ORAL CARE COMPOSITIONS AND ORAL CARE COMPOSITIONS BASED THEREOF

(71) Applicant: Colgate-Palmolive Company, New York, NY (US)

(72) Inventors: Shao Peng Xu, Guangzhou (CN); Yuan Hui Xie, Guangzhou (CN); Dahlia Chen, Guangzhou (CN)

(73) Assignee: Colgate-Palmolive Company, New York, NY (US)

( * ) Notice: Subject to any disclaimer, the term of this patent is extended or adjusted under 35 U.S.C. 154(b) by 713 days.

(21) Appl. No.: 17/637,794

(22) PCT Filed: Aug. 23, 2019

(86) PCT No.: PCT/CN2019/102125
§ 371 (c)(1),
(2) Date: Feb. 23, 2022

(87) PCT Pub. No.: WO2021/035378
PCT Pub. Date: Mar. 4, 2021

(65) Prior Publication Data
US 2022/0280403 A1   Sep. 8, 2022

(51) Int. Cl.
*A61K 8/46* (2006.01)
*A61K 8/63* (2006.01)
*A61Q 11/00* (2006.01)

(52) U.S. Cl.
CPC .............. *A61K 8/463* (2013.01); *A61K 8/63* (2013.01); *A61Q 11/00* (2013.01)

(58) Field of Classification Search
CPC ........... A61K 8/463; A61K 8/63; A61Q 11/00
See application file for complete search history.

(56) References Cited

U.S. PATENT DOCUMENTS

| | | |
|---|---|---|
| 4,606,911 A | 8/1986 | Hayashi et al. |
| 2006/0134025 A1 | 6/2006 | Trivedi et al. |
| 2010/0055163 A1* | 3/2010 | Garcia-Granados Lopez De Hierro ................. A61K 31/216 514/731 |

FOREIGN PATENT DOCUMENTS

| | | | |
|---|---|---|---|
| CN | 1539402 | 10/2004 | |
| CN | 1582950 A * | 2/2005 | |
| CN | 101115531 | 1/2008 | |
| CN | 101284011 | 10/2008 | |
| EP | 1824566 | 8/2007 | |
| EP | 2033620 | 3/2009 | |
| EP | 3999023 | 5/2022 | |
| JP | H01290619 | 11/1989 | |
| WO | 2019/108215 | 6/2019 | |
| WO | WO-2019108215 A1 * | 6/2019 | ............ A61K 8/347 |
| WO | 2021/035378 | 3/2021 | |

OTHER PUBLICATIONS

Machine translation of CN-1582950-A. 2005, pp. 1-8 (Year: 2005).*
Claudio, et al., "Valorization of Olive Tree Leaves: Extraction of Oleanic Acid Using Aqueous Solutions of Surface-Active Ionic Liquids," Separation and Purification Technology, vol. 204, published Oct. 10, 2018.
Norouz et al., 2018, "Solubilization of drugs using sodium lauryl sulfate: Experimental data and modelling", Journal of Molecular Liquids, 268:410-414.
Yani, Liu, "Study on Oleanolic Acid Sustained-Release Tables," Chinese Master's Thesis Full-Text Database, Medicine and Health Sciences, Huazhong University of Science and Technology, Wuhan, China, Apr. 2006, China Academic Journal Electronic Publishing House, published Mar. 15, 2008.
Attokaran, Mathew, "Natural Flavorants and Pigments," (Foreign Modern Food Technology Series), China Light Industry Press, First pub. 2011 (India), Chinese version published Sep. 2014, pp. 281.
Tian, Yan et al., Preparation and Quality Evaluation of Oleanolic Acid Drop Pills, Journal of Dalian Medical University, vol. 32, No. 5 Oct. 2010, pp. 521-523 and 538.
Xiong, Fangwu, et al., Dictionary of Chinese Clinical Drugs, vol. II of Chemical Drugs, China Medical Science Press, Aug. 31, 2018, pp. 1978.
International Search Report and Written Opinion of the International Searching Authority in International Application No. PCT/CN2019/102125, mailed May 28, 2020.

* cited by examiner

*Primary Examiner* — Andrew S Rosenthal

(57) ABSTRACT

An aqueous oleanolic acid solution, including from about 0.10 to 2.5 weight % oleanolic acid, from about 60 to 90 weight % solvent, and from about 20 to 40 weight % solubility agent, wherein the solvent includes water, the solubility agent includes sodium lauryl sulfate (SLS), and the aqueous oleanolic acid solution is substantially free of ethanol and dimethyl sulfoxide (DMSO).

11 Claims, No Drawings

METHOD TO INCORPORATE OLEANOLIC ACID INTO ORAL CARE COMPOSITIONS AND ORAL CARE COMPOSITIONS BASED THEREOF

CROSS-REFERENCE TO RELATED APPLICATIONS

This application is a national stage application under 35 U.S.C. § 371 of International Application No. PCT/CN2019/102125, filed on Aug. 23, 2019, the contents of which are hereby incorporated by reference in its entirety.

BACKGROUND

Gum bleeding is associated with many common oral conditions, such as gingivitis. Gum bleeding may be caused by a buildup of plaque, a soft, sticky, colorless film of bacteria that forms on the teeth and gums, and produces toxins that may inflame or infect the gum tissue to cause gingivitis. Gingivitis is the initial stage of gum disease and, if left untreated, may cause periodontitis.

Antibacterial agents have been used in oral care products to reduce plaque and gingivitis, and hence reduce gum bleeding. Similarly, hemostatic agents have also been used in oral care products to reduce gum bleeding. Oleanolic acid is believed to have both antibacterial and hemostatic properties, and there is a desire to create oral care compositions incorporating oleanolic acid. However, due to its hydrophobic properties, oleanolic acid is often dissolved in solvents, such as ethanol or dimethyl sulfoxide (DMSO), to facilitate its use. The use of such solvents limits the incorporation of oleanolic acid in oral care compositions which wish to avoid or limit the use of those ingredients.

Accordingly, it would be useful to develop new methods to incorporate oleanolic acid into oral care compositions, such as toothpastes and mouthwashes, and in particular, aqueous oleanolic acid solutions that can be used to prepare oral care compositions.

BRIEF SUMMARY

This summary is intended merely to introduce a simplified summary of some aspects of one or more implementations of the present disclosure. Further areas of applicability of the present invention will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing an aqueous oleanolic acid solution, including from about 0.10 weight % to about 2.5 weight % oleanolic acid, based on a total weight of the aqueous oleanolic acid solution; from about 60 weight % to about 90 weight % solvent, based on the total weight of the aqueous oleanolic acid solution; and from about 20 weight % to about 40 weight % solubility agent, based on the total weight of the aqueous oleanolic acid solution, wherein the solvent includes water, wherein the solubility agent includes sodium lauryl sulfate (SLS), and wherein the aqueous oleanolic acid solution is substantially free of ethanol and dimethyl sulfoxide (DMSO).

The aqueous oleanolic acid solution may include from about 20 weight % to about 40 weight % SLS, based on the total weight of the aqueous oleanolic acid solution; and from about 60 weight % to about 80 weight % water, based on the total weight of the aqueous oleanolic acid solution.

The aqueous oleanolic acid solution may include SLS and water at a weight ratio of from about 2.7:5 to about 1.6:5.

The aqueous oleanolic acid solution may consist essentially of from about 0.10 weight % to about 2.5 weight % oleanolic acid, based on the total weight of the aqueous oleanolic acid solution; from about 60 weight % to about 90 weight % water, based on the total weight of the aqueous oleanolic acid solution; and from about 20 weight % to about 40 weight % SLS, based on the total weight of the aqueous oleanolic acid solution.

The foregoing and/or other aspects and utilities embodied in the present disclosure may also be achieved by providing an aqueous oleanolic acid solution, including a first oleanolic acid solution; and a second oleanolic acid solution, wherein the first oleanolic acid solution is substantially free of ethanol and DMSO, wherein the first oleanolic acid solution includes from about 0.10 weight % to about 2.5 weight % oleanolic acid, based on a total weight of the first oleanolic acid solution, from about 20 weight % to about 40 weight % SLS, based on the total weight of the first oleanolic acid solution, and from about 60 weight % to about 90 weight % water, based on the total weight of the first oleanolic acid solution, and wherein the second oleanolic acid solution includes from about 0.10 weight % to about 0.25 weight % oleanolic acid, based on a total weight of the second oleanolic acid solution, and from about 2.0 weight % to about 8.0 weight % flavorant, based on a total weight of the aqueous oleanolic acid solution.

The flavorant may include one or more of menthol, menthyl acetate, menthyl lactate, camphor, peppermint oil, eucalyptus oil, eucalyptol, anethole, eugenol, cassia, oxanone, x-irisone, propenyl guaiethol, thymol, linalool, benzaldehyde, cinnamaldehyde, N-ethyl-p-menthan-3-carboxamine, N,2,3-trimethyl-2-isopropylbutanamide, 3-1-menthoxypropane-1,2-diol, cinnamaldehyde glycerol acetal (CGA), methone glycerol acetal (MGA) or combinations or mixtures thereof.

The first oleanolic acid solution may consist essentially of from about 0.10 weight % to about 2.5 weight % oleanolic acid, based on a total weight of the first oleanolic acid solution, from about 20 weight % to about 40 weight % SLS, based on the total weight of the first oleanolic acid solution, and from about 60 weight % to about 90 weight % water, based on the total weight of the first oleanolic acid solution.

The second oleanolic acid solution may consist essentially of from about 0.01 weight % to about 0.25 weight % oleanolic acid, based on a total weight of the second oleanolic acid solution, and from about 2.0 weight % to about 8.0 weight % flavorant, based on a total weight of the aqueous oleanolic acid solution.

The foregoing and/or other aspects and utilities embodied in the present disclosure may also be achieved by providing a method of making an oral care composition incorporating oleanolic acid, including combining an aqueous oleanolic acid solution with one or more oral care ingredients to make an oral care composition, wherein the oral care composition includes from about 0.01 weight % to about 0.25 weight % oleanolic acid, based on a total weight of the oral care composition.

The aqueous oleanolic acid solution may include from about 0.10 weight % to about 2.5 weight % oleanolic acid, based on a total weight of the aqueous oleanolic acid solution, from about 60 weight % to about 90 weight % solvent, based on the total weight of the aqueous oleanolic acid solution, and from about 20 weight % to about 40 weight % solubility agent, based on the total weight of the aqueous oleanolic acid solution, the solvent may include water, and the solubility agent may include sodium lauryl sulfate (SLS).

The aqueous oleanolic acid solution may include from about 20 weight % to about 40 weight % SLS, based on the total weight of the aqueous oleanolic acid solution, and from about 60 weight % to about 90 weight % water, based on the total weight of the aqueous oleanolic acid solution.

The one or more oral care ingredients may include one or more of a carrier, a humectant, surfactants, polymers, thickeners, antioxidants, preservatives, flavoring agents, sweeteners, colorants, pH modifiers, anti-calculus agents, and fluoride sources, or combinations thereof, and the one or more oral care ingredients may be orally acceptable.

The aqueous oleanolic acid solution may include a first oleanolic acid solution, and a second oleanolic acid solution, wherein the first oleanolic solution may be substantially free of ethanol and DMSO, wherein the first oleanolic acid solution may include from about 0.10 weight % to about 2.5 weight % oleanolic acid, based on a total weight of the first oleanolic acid solution, from about 20 weight % to about 40 weight % SLS, based on the total weight of the first oleanolic acid solution, and from about 60 weight % to about 90 weight % water, based on the total weight of the first oleanolic acid solution, and wherein the second oleanolic acid solution may include from about 0.01 weight % to about 0.25 weight % oleanolic acid, based on a total weight of the second oleanolic acid solution, and from about 2.0 weight % to about 8.0 weight % flavorant, based on a total weight of the aqueous oleanolic acid solution.

The aqueous oleanolic acid solution may lack any other solubility agent, except for SLS or flavorant.

The one or more oral care ingredients may include one or more of a carrier, a humectant, surfactants, polymers, thickeners, antioxidants, preservatives, flavoring agents, sweeteners, colorants, pH modifiers, anti-calculus agents, and fluoride sources, or combinations thereof, and wherein the one or more oral care ingredients are orally acceptable.

The foregoing and/or other aspects and utilities embodied in the present disclosure may also be achieved by providing an oral care composition, including an aqueous oleanolic acid solution including oleanolic acid; and one or more oral care ingredients, wherein the oral care composition includes from about 0.01 weight % to about 0.25 weight % oleanolic acid, based on a total weight of the oral care composition, and wherein the aqueous oleanolic acid solution is substantially free of ethanol and DMSO.

The aqueous oleanolic acid solution may further include sodium lauryl sulfate (SLS), and water.

The aqueous oleanolic acid solution may consist essentially of oleanolic acid, SLS, and water.

The aqueous oleanolic acid solution may include a first oleanolic acid solution; and a second oleanolic acid solution, wherein the first oleanolic acid solution may be substantially free of ethanol and DMSO, wherein the first oleanolic acid solution may include from about 0.10 weight % to about 2.5 weight % oleanolic acid, based on a total weight of the first oleanolic acid solution, from about 20 weight % to about 40 weight % SLS, based on the total weight of the first oleanolic acid solution, and from about 60 weight % to about 90 weight % water, based on the total weight of the first oleanolic acid solution, and wherein the second oleanolic acid solution may include from about 0.01 weight % to about 0.25 weight % oleanolic acid, based on a total weight of the second oleanolic acid solution, and from about 2.0 weight % to about 8.0 weight % flavorant, based on a total weight of the aqueous oleanolic acid solution.

DETAILED DESCRIPTION

Reference will now be made in detail to the various implementations in the present disclosure. The implementations are described below to provide a more complete understanding of the components, processes, compositions, and apparatuses disclosed herein. Any examples given are intended to be illustrative, and not restrictive. However, it will be apparent to one of ordinary skill in the art that the invention may be practiced without these specific details. In other instances, well-known methods, procedures, and components have not been described in detail so as not to unnecessarily obscure aspects of the implementations.

Throughout the specification and claims, the following terms take the meanings explicitly associated herein, unless the context clearly dictates otherwise. Phrases such as "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/B/C, A/B/C, etc. In addition, throughout the specification, the meaning of "a," "an," and "the" include plural references. The meaning of "in" includes "in" and "on."

It will also be understood that, although the terms first, second, etc. may be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, components, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" may be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5-6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), +0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

Unless otherwise specified, all percentages and amounts expressed herein and elsewhere in the specification should be understood to refer to percentages by weight. The amounts given are based on the active weight of the material.

With regard to procedures, methods, techniques, and workflows that are in accordance with some implementations, some operations in the procedures, methods, techniques, and workflows disclosed herein may be combined and/or the order of some operations may be changed.

The inventors have surprisingly and unexpectedly discovered a new method for incorporating oleanolic acid into an oral care composition. In particular, the inventors have surprisingly and unexpectedly developed aqueous oleanolic acid solutions that can be used to prepare oral care compositions. For example, an aqueous oleanolic acid solution may be combined with other oral care ingredients to prepare an oral care composition incorporating oleanolic acid.

Formula 1 illustrates a chemical structure of oleanolic acid. Oleanic or oleanolic acid (3β-hydroxy-olea-12-en-28-oic) is a pentacyclic triterpenoid that is widely distributed in plants. For example, oleanolic acid may be extracted from a number of medicinal plants, such as *Calendula officinalis* L. (marigold), *Ligustrum lucidum* Ait (oleaceae), and *Hemsleya Chinensis* Cogn. As described above, oleanolic acid may have antibacterial and/or hemostatic properties that make it a desirable ingredient for oral care compositions.

Oleanolic acid is usually obtained as a solid powder. Because of the hydrophobic nature of oleanolic acid, it is often necessary to dissolve the oleanolic acid powder into a solution to facilitate the incorporation of oleanolic acid into an oral care composition. Traditionally, solvents, such as ethanol or DMSO have been used to dissolve oleanolic acid powder in a solution. However, many oral care composition try to limit the content of ethanol or DMSO.

Formula 1:

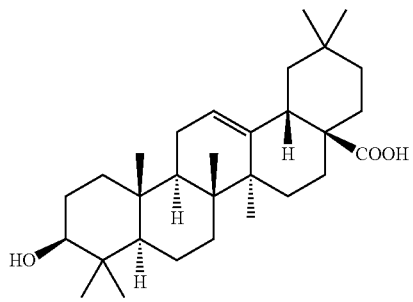

The aqueous oleanolic acid solution includes oleanolic acid, a solvent, and a solubility agent.

The aqueous oleanolic acid solution may include from about 0.10 weight % to about 8.0 weight % oleanolic acid, based on a total weight of the aqueous oleanolic acid solution. For example, the aqueous oleanolic acid solution may include from about 0.20 weight % to about 2.25 weight % oleanolic acid, from about 0.50 weight % to about 2.0 weight % oleanolic acid, or from about 1.00 weight % to about 2.0 weight % oleanolic acid. In some implementations, the aqueous oleanolic acid solution includes from about 0.11 weight % to about 2.31 weight % oleanolic acid, based on a total weight of the aqueous oleanolic acid solution. In other implementations, the aqueous oleanolic acid solution includes from about 2.0 weight % to about 8.0 weight % oleanolic acid, based on a total weight of the aqueous oleanolic acid solution. For example, from about 3.0 weight % to about 7.0 weight % and from about 3.10 weight % to about 6.50 weight % oleanolic acid, based on a total weight of the aqueous oleanolic acid solution.

The aqueous oleanolic acid solution includes from about 60 weight % to about 90 weight % solvent, based on a total weight of the aqueous oleanolic acid solution. In other implementations, the solvent may make up the balance of the aqueous oleanolic acid solution.

The solvent may include water. For example, deionized water. In some implementations, the solvent may consist essentially of water. In other implementations, the solvent does not include, is free, or is substantially free of ethanol and/or DMSO. As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, solution, or phase.

In other implementations, the aqueous oleanolic acid solution lacks any other solvent. Said in another way, the aqueous oleanolic acid solution may only include water as a solvent. For example, the aqueous oleanolic acid solution may not include, may be free, or may be substantially free of ethanol and/or DMSO.

In one implementation, the aqueous oleanolic acid solution may include from about 60 weight % to about 90 weight % water, based on a total weight of the aqueous oleanolic acid solution. For example, the aqueous oleanolic acid solution may include from about 61 weight % to about 85 weight % water, from about 65 weight % to about 80 weight % water, or from about 70 weight % to about 80 weight % water. In some implementations, the aqueous oleanolic acid solution includes about 61.5 weight %, about 70 weight %, about 75 weight %, and/or about 76 weight % water, based on a total weight of the aqueous oleanolic acid solution. In some implementations, the water is a deionized water. In other implementations, the water is a distilled water.

The solubility agent may include SLS. The inventors have surprisingly and unexpectedly discovered that SLS may aid, facilitate, or otherwise enhance the solubility or solubilization of oleanolic acid in the aqueous oleanolic acid solution. In some implementations, the solubility agent consists essentially of SLS. In other implementations, the aqueous oleanolic acid solution does not include, is free, or is substantially free of any other solubility agent. Said in another way, in some implementations, the aqueous oleanolic acid solution may only include SLS as the solubility agent. For example, the aqueous oleanolic acid solution may include oleanolic acid, water, and SLS. In some implementations, the aqueous oleanolic acid solution may consists essentially of oleanolic acid, water, and SLS.

The aqueous oleanolic acid solution may include from about 20 weight % to about 40 weight % SLS, based on a total weight of the aqueous oleanolic acid solution. For example, the aqueous oleanolic acid solution may include from about 20 weight % to about 35 weight % SLS, from about 25 weight % to about 35 weight % SLS, or from about 25 weight % to about 30 weight % SLS. In some implementations, the aqueous oleanolic acid solution includes about 24 weight %, about 27 weight %, about 30 weight %, and/or about 35 weight % SLS, based on a total weight of the aqueous oleanolic acid solution.

In some implementations, the amount of SLS in the aqueous oleanolic acid solution may be given in terms of a ratio. SLS and water may be present in a weight ratio of from about 2.7:5 to about 1.6:5. For example, SLS and water may be present in a weight ratio of 2.7:5, 2.2:5, 1.9:5, and 1.6:5.

The solubility agent may include a flavorant. The flavorant may include one or more flavorants. The inventors have surprisingly and unexpectedly discovered that the flavorant may also aid, facilitate, or otherwise enhance the solubility or solubilization of oleanolic acid in an aqueous oleanolic acid solution. In some implementations, the solubility agent includes a flavorant. In other implementations, the solubility agent consists essentially of a flavorant. In other implementations, the aqueous oleanolic acid solution does not include, is free, or is substantially free of any other solubility agent. Said in another way, in some implementations, the aqueous oleanolic acid solution may only include SLS and/or may only include a flavorant as the solubility agent.

For example, the aqueous oleanolic acid solution may include oleanolic acid, water, and SLS. In other implementations, the aqueous oleanolic acid solution includes oleanolic acid, water, and a flavorant. In some implementations, the aqueous oleanolic acid solution may consists essentially of oleanolic acid, water, and SLS. In some implementations, the aqueous oleanolic acid solution may consists essentially of oleanolic acid, water, and a flavorant. In yet other implementations, the aqueous oleanolic acid solution may consists essentially of oleanolic acid and a flavorant.

The flavorant may include, but is not limited to, one or more of menthol, menthyl acetate, menthyl lactate, camphor, eucalyptus oil, peppermint oil, eucalyptol, anethole, eugenol, cassia, oxanone, x-irisone, propenyl guaiethol, thymol, linalool, benzaldehyde, cinnamaldehyde, N-ethyl-p-menthan-3-carboxamine, N,2,3-trimethyl-2-isopropylbutanamide, 3-1-menthoxypropane-1,2-diol, cinnamaldehyde glycerol acetal (CGA), methone glycerol acetal (MGA), or the like, or combinations and mixtures thereof. In some implementations, the flavorant may be free or substantially free of ethanol.

The aqueous oleanolic acid solution may include from about 0.5 weight % to about 2.0 weight % flavorant, based on a total weight of the aqueous oleanolic acid solution. For example, the aqueous oleanolic acid solution may include from about 1.0 weight % to about 2.0 weight % flavorant, based on the total weight of the aqueous oleanolic acid solution. In some implementations, the aqueous oleanolic acid solution includes about 1.5 weight % flavorant, based on the total weight of the aqueous oleanolic acid solution. In other implementations, the aqueous oleanolic acid solution may include up to 99 weight % flavorant, based on the total weight of the aqueous oleanolic acid solution. For example, the aqueous oleanolic acid solution may include up to 94 weight % or 97 weight % flavorant.

In some implementations, the aqueous oleanolic acid solution may include a first oleanolic acid solution and a second oleanolic acid solution. The first oleanolic acid solution may include oleanolic acid, water, and SLS. The second oleanolic acid solution may include oleanolic acid, water, and a flavorant. The second oleanolic acid solution may also include oleanolic acid and flavorant. In some implementations, the first oleanolic acid solution consists essentially of oleanolic acid, water, and SLS. In some implementations, the second oleanolic acid solution consists essentially of oleanolic acid, water, and a flavorant. In yet other implementations, the second oleanolic acid solution consists essentially of oleanolic acid and a flavorant.

The aqueous oleanolic acid solution may be combined with other oral care ingredients to prepare an oral care composition incorporating oleanolic acid.

The amount of aqueous oleanolic acid solution in the oral care composition may be configured to provide a given amount of oleanolic acid to the oral care composition. For example, the amount of the aqueous oleanolic acid solution in the oral care composition may be configured to provide from about 0.01 weight % to about 0.20 weight % of oleanolic acid to the oral care composition, based on the total weight of the oral care composition. In other implementations, the amount of the aqueous oleanolic acid solution in the oral care composition may be configured to provide from about 0.05 weight % to about 0.20 weight % of oleanolic acid to the oral care composition, from about 0.05 weight % to about 0.15 weight % of oleanolic acid to the oral care composition, or from about 0.10 weight % to about 0.15 weight % of oleanolic acid to the oral care composition, based on the total weight of the oral care composition. In one implementations, the amount of the aqueous oleanolic acid solution in the oral care composition is configured to provide about 0.10 weight % oleanolic acid to the oral care composition, based on the total weight of the oral care composition.

The oral care composition may include additional ingredients such as carriers, dispersants, whitening agents, flavoring agents, tartar control agents, surfactants, sweeteners, humectants, colorants, antibacterial agents, preservatives, dyes, and pigments.

In various implementations of the present disclosure, the oral care composition includes an orally acceptable carrier. As used herein, an "orally acceptable carrier" refers to a material or combination of materials that are safe for use in the oral care compositions of the present disclosure while retaining significant efficacy of oleanolic acid and/or the aqueous oleanolic acid solution described above. In certain implementations, the carrier is specifically selected to ensure that there is no substantially reduction in efficacy for the oleanolic acid and/or the aqueous oleanolic acid solution described above. For example, the oral care composition may use water as the carrier. In certain implementations, the oral care composition includes 90 weight % or less, 70 weight % or less, or 50 weight % or less carrier, based on the total weight of the oral care composition.

In certain implementations, the oral care composition may include one or more humectants. In some implementations, the humectant is a mixture of humectants, such as glycerin and sorbitol, and a polyhydric alcohol, such as propylene glycol, butylene glycol, hexylene glycol, polyethylene glycol. In certain implementations, the oral care composition includes from 5 weight % to 40 weight % or from 10 weight % to 30 weight % humectant, based on a total weight of the oral care composition.

The oral care composition may include one or more whitening agent. As used herein, a "whitening agent" is a material that affects whitening of a tooth surface to which it is applied. For example, in some implementations, the whitening agent is an oxidizing agent. In its broadest sense, "oxidizing agent" is intended to include those compounds which can accept an electron from another molecule in the environment of the oral cavity without having a deleterious or unacceptably harmful effect on the oral cavity in normal and accepted use.

In some implementations, the whitening agent may include peroxides and hydroperoxides, such as hydrogen peroxide, peroxides of alkali and alkaline earth metals, organic peroxy compounds, peroxy acids, salts thereof, and mixtures thereof. Peroxides of alkali and alkaline earth metals include lithium peroxide, potassium peroxide, sodium peroxide, magnesium peroxide, calcium peroxide, barium peroxide, and mixtures thereof. Organic peroxy compounds include urea peroxide, carbamide peroxide (also known as urea hydrogen peroxide), glyceryl hydrogen peroxide, alkyl hydrogen peroxides, dialkyl peroxides, alkyl peroxy acids, peroxy esters, diacyl peroxides, benzoyl peroxide, and monoperoxyphthalate, and mixtures thereof. Peroxy acids and their salts include organic peroxy acids such as alkyl peroxy acids, and monoperoxyphthalate and mixtures thereof, as well as inorganic peroxy acid salts such as percarbonate, perphosphate, perborate and persilicate salts of alkali and alkaline earth metals such as lithium, potassium, sodium, magnesium, calcium and barium, and mixtures thereof. In some implementations a non-peroxide whitening agent may be provided. Whitening agents among those useful herein include non-peroxy compounds, such as chlorine dioxide, chlorites and hypochlorites. Chlorites and hypochlorites include those of alkali and alkaline earth metals such as lithium, potassium, sodium, magnesium, calcium and barium. Non-peroxide whitening agents also include colorants, such as titanium dioxide and hydroxyapatite.

In some implementations, the oral care composition includes from about 0.01% to about 50% whitening agent based on a total weight of the oral care composition. For example, the oral care composition includes from about 0.05 weight % to about 40 weight % whitening agent. In one implementation, the oral care composition includes about 0.1 weight % whitening agent based on a total weight of the oral care composition.

In one implementation, the oral care composition includes one or more surfactants. In some implementations, the surfactants enhance stability of the composition, help clean the oral cavity surfaces through detergency, and provide foam upon agitation, e.g., during brushing with an oral care composition of the disclosure. Surfactants or surface active agents generally achieve increased whitening action by thoroughly dispersing the whitening agent throughout the oral cavity. In various implementations, suitable surface active agents may function as a surface active agent, emulsifier, and/or foam modulator.

Any orally acceptable surfactant, most of which are anionic, nonionic, cationic, or amphoteric, may be used. A combination of surfactants may also be used. Suitable anionic surfactants include without limitation water-soluble salts of $C_{8-20}$ alkyl sulfates, sulfonated monoglycerides of $C_{8-20}$ fatty acids, sarcosinates, taurates and the like. Illustrative examples of these and other classes include sodium lauryl sulfate, sodium cocoyl monoglyceride sulfonate, sodium lauryl sarcosinate, sodium lauryl isoethionate, sodium laureth carboxylate, and sodium dodecyl benzenesulfonate. Suitable nonionic surfactants include without limitation poloxamers, polyoxyethylene sorbitan esters, fatty alcohol ethoxylates, alkylphenol ethoxylates, tertiary amine oxides, tertiary phosphine oxides, dialkyl sulfoxides and the like. Suitable amphoteric surfactants include, without limitation, derivatives of $C_{8-20}$ aliphatic secondary and tertiary amines having an anionic group such as carboxylate, sulfate, sulfonate, phosphate or phosphonate. A suitable example is cocoamidopropyl betaine.

In some implementations, the oral care composition includes from about 0.01% to about 20.0% surfactant based on a total weight of the oral care composition. For example, the oral care composition includes from about 1.0 weight % to about 10.0 weight % surfactant. In one implementation, the oral care composition includes about 2 weight % surfactant based on a total weight of the oral care composition. For example, the oral care composition may include about 2 weight % sodium lauryl sulfate.

In certain implementations, the oral care composition may include thickening agents or thickeners. Any orally acceptable thickening agent may be used, including without limitation carbomers, also known as carboxyvinyl polymers, carrageenans, also known as Irish moss and more particularly carrageenan (iota-carrageenan), high molecular weight polyethylene glycols (such as CARBOWAX™, available from The Dow Chemical Company), cellulosic polymers such as hydroxyethylcellulose, carboxymethylcellulose ("CMC") and salts thereof, e.g., CMC sodium, natural gums such as karaya, xanthan, gum arabic and tragacanth, colloidal magnesium aluminum silicate, and colloidal or fumed silica and mixtures of the same. The thickening agent may be a combination of one or more orally acceptable thickening agents.

In some implementations, the oral care composition includes from about 0.01% to about 30% thickening agent based on a total weight of the oral care composition. For example, the oral care composition includes from about 0.1 weight % to about 20 weight % thickening agent. In yet another example, the oral care composition includes from about 0.5 weight % to about 10 weight % thickening agent based on a total weight of the oral care composition. For example, the oral care composition may include about 3 weight % fumed silica.

In some implementations, the oral care composition includes an antioxidant. Acceptable antioxidants include BHA, BHT, vitamin A, carotenoids, vitamin E, flavonoids, polyphenols, ascorbic acid, herbal antioxidants, chlorophyll, melatonin and mixtures thereof. In some implementations, the oral care composition includes from about 0.001% to about 1% antioxidants based on a total weight of the oral care composition. In one implementation, the oral care composition includes about 0.03 weight % antioxidant by weight.

In certain implementations, the oral care composition includes one or more flavoring agents. Useful flavoring agents include any material or mixture of materials operable to enhance the taste of the oral care composition. Any orally acceptable natural or synthetic flavoring agent may be used, such as flavoring oils, flavoring aldehydes, esters, alcohols, similar materials, and combinations thereof. Flavoring agents include vanillin, sage, marjoram, parsley oil, spearmint oil, cinnamon oil, oil of wintergreen (methylsalicylate), peppermint oil, clove oil, bay oil, anise oil, eucalyptus oil, citrus oils, fruit oils and essences including those derived from lemon, orange, lime, grapefruit, apricot, banana, grape, apple, strawberry, cherry, pineapple, etc., bean- and nut-derived flavors such as coffee, cocoa, cola, peanut, almond, etc., adsorbed and encapsulated flavorants, and mixtures thereof. Also encompassed within flavoring agents herein are ingredients that provide fragrance and/or other sensory effect in the mouth, including cooling or warming effects. Such ingredients include menthol, menthyl acetate, menthyl lactate, camphor, eucalyptus oil, eucalyptol, anethole, eugenol, cassia, oxanone, x-irisone, propenyl guaiethol, thymol, linalool, benzaldehyde, cinnamaldehyde, N-ethyl-p-menthan-3-carboxamine, N,2,3-trimethyl-2-isopropylbutanamide, 3-1-menthoxypropane-1,2-diol, cinnamaldehyde glycerol acetal (CGA), methone glycerol acetal (MGA) and mixtures thereof.

In some implementations, the oral care composition includes from about 0.01% to about 5% flavoring agents based on a total weight of the oral care composition. For example, the oral care composition includes from about 0.05 weight % to about 3 weight % flavoring agents. In yet another implementation, the oral care composition includes from about 0.1 weight % to about 3 weight %, from about 0.2 weight % to about 2.5 weight %, or about 1.5 weight % flavoring agents based on a total weight of the oral care composition. For example, the oral care composition may include about 1.5 weight % of dental cream flavor.

In some implementations, the oral care composition may also include one or more sweeteners. Sweeteners among those useful herein include orally acceptable natural or artificial, nutritive or non-nutritive sweeteners. Such sweeteners include dextrose, polydextrose, sucrose, maltose, dextrin, dried invert sugar, mannose, xylose, ribose, fructose, levulose, galactose, corn syrup (including high fructose corn syrup and corn syrup solids), partially hydrolyzed starch, hydrogenated starch hydrolysate, sorbitol, mannitol, xylitol, maltitol, isomalt, aspartame, neotame, saccharin and salts thereof, sucralose, dipeptide-based intense sweeteners, cyclamates, dihydrochalcones and mixtures thereof. Some implementations may include one or more sweeteners. In some implementations, the oral care composition includes from about 0.005% to about 5% sweeteners based on a total weight of the oral care composition. In other implementations, the oral care composition includes from about 0.01% to about 1% sweeteners based on a total weight of the oral care composition. For example, the oral care composition may include about 0.5 weight % sodium saccharin and about 0.04 weight % sucralose.

In some implementations, the oral care composition may include colorants. Colorants, such as dyes or pigments, may be food color additives presently certified under the Food Drug & Cosmetic Act for use in food and ingested drugs, including dyes such as FD&C Red No. 3 (sodium salt of tetraiodofluorescein), Food Red 17, disodium salt of 6-hydroxy-5-{(2-methoxy-5-methyl-4-sulphophenyl)azo}-2-naphthalenesulfonic acid, Food Yellow 13, sodium salt of a mixture of the mono and disulphonic acids of quinophtalone or 2-(2-quinolyl) indanedione, FD&C Yellow No. 5 (sodium salt of 4-p-sulfophenylazo-1-p-sulfophenyl-5-hydroxypyrazole-3 carboxylic acid), FD&C Yellow No. 6 (sodium salt of p-sulfophenylazo-B-naphtol-6-monosulfonate), FD&C Green No. 3 (disodium salt of 4-{[4-(N-ethyl-p-sulfobenzylamino)-phenyl]-(4-hydroxy-2-sulfoniumphenyl)-methylene}-[1-(N-ethyl-N-p-sulfobenzyl)-DELTA-3,5-cyclohexadienimine], FD&C Blue No. 1 (disodium salt of dibenzyldiethyl-diamino-triphenylcarbinol trisulfonic acid anhydrite), FD&C Blue No. 2 (sodium salt of disulfonic acid of indigotin) and mixtures thereof in various proportions. Typically, colorants, if included, are present in very small quantities.

In some implementations, the oral care composition may also include one or more pH modifying agents. The pH modifying agents among those useful herein include acidifying agents to lower pH, basifying agents to raise pH and buffering agents to control pH within a desired range. For example, one or more compounds selected from acidifying, basifying and buffering agents can be included to provide a pH of 2 to 10, or in various implementations from about 2 to about 8, from about 3 to about 9, from about 4 to about 8, from about 5 to about 7, from about 6 to about 10, and from about 7 to about 9. Any orally acceptable pH modifying agent may be used, including without limitation carboxylic, phosphoric and sulfonic acids, acid salts (e.g., monosodium citrate, disodium citrate, monosodium malate, etc.), alkali metal hydroxides such as sodium hydroxide, carbonates such as sodium carbonate, bicarbonates, sesquicarbonates, borates, silicates, phosphates (e.g., monosodium phosphate, trisodium phosphate, pyrophosphate salts, etc.), imidazole and mixtures thereof. One or more pH modifying agents are optionally present in a total amount effective to maintain the composition in an orally acceptable pH range. In some implementations, the oral care composition includes from about 0.01% to about 10% pH modifier agents based on a total weight of the oral care composition. For example, the oral care composition may include about 0.9 weight % sodium acid pyrophosphate (SAPP) and about 2 weight % tetrasodium pyrophosphate (TSPP) as a pH modifier.

The oral care composition may include one or more preservatives. In some implementations, the preservatives improve an antimicrobial characteristic of the oral care composition to improve storage life or prevent decay.

In certain implementations, the one or more preservatives include at least one of sodium benzoate, methyl paraben, ethyl paraben, zinc citrate, zinc oxide, triclosan, stannum salts, and combinations thereof.

The oral care composition may include an effective amount of preservatives. For example, the oral care composition may include an amount of preservatives effective to reduce a spoilage of the oral care composition during storage or use.

The oral care composition of the present disclosure may also include one or more additional active ingredients, which are operable for the prevention or treatment of a condition or disorder of hard or soft tissue of the oral cavity, the prevention or treatment of a physiological disorder or condition, or to provide a cosmetic benefit.

Some implementations of the present disclosure include a dental abrasive or combination of dental abrasive agents. As used herein, the term "abrasive" or "abrasive agent" also includes materials commonly referred to as "polishing agents." Any orally acceptable abrasive may be used, but typically, type, fineness (particle size) and amount of abrasive should be selected so that tooth enamel is not excessively abraded in normal use of the composition. Suitable abrasives include without limitation silica (in the form of silica gel, hydrated silica or precipitated silica), alumina, insoluble phosphates, calcium carbonate, resinous abrasives such as urea-formaldehyde condensation products and the like.

Among insoluble phosphates useful as abrasives are orthophosphates, polymetaphosphates and pyrophosphates. Illustrative examples are dicalcium orthophosphate dihydrate, calcium pyrophosphate, n-calcium pyrophosphate, tricalcium phosphate, calcium polymetaphosphate and insoluble sodium polymetaphosphate.

Average particle size of an abrasive, if present, is generally from about 0.1 to 100 about μm. For example, the particle size may be from about 1 to about 80 μm or from about 5 to about 60 μm. In some implementations, one or more abrasives are present in an amount of from about 0.01% to about 70% by weight, based on the total weight of the oral care composition. In other implementations, the oral care composition includes from about 0.1 weight % to about 60 weight % abrasives. In some implementations, the abrasive is calcium pyrophosphate. In some implementations, the oral care composition includes from 0.01 weight % to about 70 weight % calcium pyrophosphate based on a total weight of the oral care composition. In another implementation, the oral care composition includes about 20 weight % calcium pyrophosphate.

In various implementations of the present disclosure, the oral care composition includes an anticalculus agent. Suitable anticalculus agents include without limitation phosphates and polyphosphates (for example pyrophosphates), polyaminopropanesulfonic acid (AMPS), hexametaphosphate salts, zinc citrate trihydrate, polypeptides, polyolefin sulfonates, polyolefin phosphates, diphosphonates. In some implementations, the anticalculus agent is present in an amount of from about 0.01% to about 30% weight based on the total weight of the oral care composition. In some implementations, the oral care composition includes a mixture of anticalculus agents. In some implementations, tetrasodium pyrophosphate (TSPP) and sodium tripolyphosphate (STPP) are used as the anticalculus agents. In some implementations, the anticalculus agent includes from 0.1% to 10 weight % TSPP, or about 2 weight % TSPP.

The oral care compositions of the present disclosure may also include a synthetic anionic polymeric polycarboxylate. The synthetic anionic polymeric polycarboxylate may act as a stabilizer for the polyphosphate anti-tartar agent and may help to block access of painful or pain-causing materials, such as sugars, to the tooth nerves.

In some implementations, the oral care composition optionally includes a source of fluoride ions. In some implementations, the source of fluoride ions is selected from: fluoride, monofluorophosphate (MFP), and fluorosilicate salts. In some implementations, one or more fluoride ion-releasing compounds are optionally present in an amount providing a total of 100 to 20,000 ppm, 200 to 5,000 ppm, or 500 to 2,500 ppm, fluoride ions. If present, in some implementations, the amount of fluoride source in the oral care composition ranges from about 0.01% to about 10% by weight, based on the total weight of the oral care composition, typically about 0.5% to about 1.5 weight %. For example, the oral care composition may include about 0.76 weight % MFP.

The compositions also may include a stannous ion or a stannous ion source to mitigate calcium loss. Suitable stannous ion sources include without limitation stannous fluoride, other stannous halides such as stannous chloride dihydrate, stannous pyrophosphate, organic stannous carboxylate salts such as stannous formate, acetate, gluconate, lactate, tartrate, oxalate, malonate and citrate, stannous ethylene glyoxide and the like. In some implementations, one or more stannous ion sources are included in the oral care composition. For example, the oral care composition may include from about 0.01% to about 10% stannous ion source by weight, based on the total weight of the oral care composition. In one implementation, the oral care composition includes from about 0.1 weight % to about 7 weight % stannous ion source or from about 0.2 weight % to about 5 weight % stannous ion source.

All ingredients used in the compositions described herein should be orally acceptable. "Orally acceptable" means an ingredient which is present in the composition as described in an amount and form which does not render the composition unsafe, unpalatable, or otherwise unsuitable for use in the oral cavity. In addition, the additional ingredients should not substantially inhibit the efficacy of oleanolic acid and/or the aqueous oleanolic acid solution described above.

Generally, viscosity is an important parameter for oral care compositions, such as toothpastes or whitening gels. For example, when the viscosity of an oral care composition is too low, it may become too runny and physical phase separation may take place. In some cases, this will not only affect the aesthetics of the oral care composition but also the homogeneity of the ingredients in the oral care composition. On the other hand, if the viscosity of the oral care compositions is too high, the oral care composition will be difficult to manufacture and package. In addition, oral care compositions with high viscosity are very difficult for users to evacuate from commonly used packages, such as tubes or syringes. Accordingly, it's important to select ingredients for oral care compositions that achieve a desirable range of viscosity to ensure product manufacturability, stability, and quality, as well as consumer acceptance.

In some implementations, the viscosity of the oral care composition is from about 10,000 centipoise (cPs) to about 500,000 cPs at 25° C. For example, the viscosity of the oral care composition is from about 50,000 cPs to about 400,000 cPs at 25° C. In one implementation, the viscosity of the oral care composition is from about 125,000 cPs to about 300,000 cPs at 25° C.

EXAMPLES

Aspects of the present disclosure may be further understood by referring to the following examples. The examples are illustrative, and are not intended to be limiting implementations thereof.

Example 1

The solubility of oleanolic acid in varying solutions of SLS and water was evaluated. In particular, exemplary solutions (1)-(5) were prepared as follows: formula amounts of SLS and water were combined and mixed for 30 seconds to form a mixture. Then, formula amounts of oleanolic acid powder were added to the mixture and mixed in a mixer at 300 rpm for up to 30 minutes to create a solution. Solubility assessments were done every 10 minutes, with a clear condition indicating that the oleanolic acid was completely dissolved in the solution.

Table 1 illustrates the solubility of oleanolic acid in various solutions of SLS and water.

As illustrated in Table 1, oleanolic acid dissolves in solutions including SLS and water. In particular, oleanolic acid completely dissolved in exemplary solutions (3)-(5) including between 24 weight % and 30 weight % SLS, and partially dissolved in exemplary solution (2) including about 35 weight % SLS. As further illustrated in Table 1, solutions (3)-(4) became clear after 20 minutes of mixing, solution (5) became clear after 30 minutes of mixing, and solution (2) remained cloudy after 30 minutes of mixing. It was surprisingly and unexpectedly discovered that solutions (3)-(4) required the least amount of time to become clear, even though they did not contained the most SLS or water content, indicating a synergistic effect between the amounts of SLS and water. While not bound to any particular theory, the inventors believe that, when present in the amounts or ratios described in the present disclosure, the surfactant properties of SLS may lower the surface tension of the solvent such that the hydrophilic heads of SLS are immersing within the oleanolic acid to dissolve it.

TABLE 1

|  | Solution (1) | Solution (2) | Solution (3) | Solution (4) | Solution (5) |
|---|---|---|---|---|---|
| Oleanolic Acid | 1.16% | 1.16% | 1.16% | 1.16% | 1.16% |
| SLS | — | 35% | 30% | 27% | 24% |
| Water | 98.84% | 63.84% | 68.84% | 71.84% | 74.84% |
| Solubility after mixing | immiscible | cloudy | complete clear | complete clear | complete clear |

Example 2

The solubility of oleanolic acid in solutions of flavorant was also evaluated. In particular, exemplary solutions (6)-(7) were prepared as follows: formula amounts of flavorant (peppermint) and formula amounts of oleanolic acid powder were combined and mixed in a mixer at 300 rpm for up to 30 minutes to create a solution. Solubility assessments were done every 10 minutes, with a clear condition indicating that the oleanolic acid was completely dissolved in the solution.

Table 2 illustrates the solubility of oleanolic acid in flavorant. As illustrated in Table 2, oleanolic acid dissolves in solutions including flavorant. In particular, 3.13 weight % oleanolic acid completely dissolved in exemplary solution (6) including 96.87% flavorant, and 6.25 weight % oleanolic acid partially dissolved in exemplary solution (7) including 93.75% flavorant. While not bound to any particular theory, the inventors believe that, when present in the amounts or ratios described in the present disclosure, solvents present in the flavorant, such as propylene glycol, may dissolve a certain amount of oleanolic acid.

TABLE 2

|  | Solution (6) | Solution (7) |
|---|---|---|
| Oleanolic Acid | 3.13% | 6.25% |
| Flavorant | 96.87% | 93.75% |
| Solubility after mixing | complete clear | cloudy |

Example 3

Table 3 illustrates an exemplary oral care composition incorporating aqueous oleanolic acid solutions according to implementations of the present disclosure. The exemplary oral care composition (1) of Table 3 was prepared as follows: a first mixture was prepared by mixing 24 weight % SLS and 76 weight % water. 40 grams of oleanolic acid powder was added to the first mixture and mixed for 30 minutes at 300 RPM in an IKA mixer to create an aqueous oleanolic acid solution.

Separately, the formula amounts of flavorant, saccharin, fluoride ion source, and anticalculus agents were mixed in water in an IKA mixer. The formula amounts of sorbitol (humectant) and Carrageenan gum (thickener) were then added to the mixture, the temperature was raised to 60-65° C., and mixed until the gum was completely dispersed to create a gel.

The formula amounts of dicalcium phosphate dehydrate (abrasive) were then added to the gel and mixed for 10 minutes at a slight vacuum (0.075 MPa).

The aqueous oleanolic acid solution were then added to the gel and mixed for 5 minute at 46° C. and 0.075 MPa. The vacuum was then increased to −0.092 MPa and mixed for 15 minutes to create Oral Care Composition #1.

TABLE 3

Oral Care Composition (1)

| Ingredients | Wt. % |
|---|---|
| Oleanolic Acid | 0.02-2.0 |
| Eugenol | 0.02-0.5 |
| Sodium Lauryl Sulfate (SLS) | 0.5-5.0 |
| Flavorant | 0.8-2.0 |
| Humectants | 15-70 |
| Thickening Agents | 5.0-15 |
| Abrasives | 10-55 |
| Fluoride ion source | 0.1-1 |
| Anticalculus agents | 0.1-5 |
| Sweetener (Saccharin) | 0.1-0.5 |
| Water and minors | 10-40 |

The present disclosure has been described with reference to exemplary implementations. Although a few implementations have been shown and described, it will be appreciated by those skilled in the art that changes may be made in these implementations without departing from the principles and spirit of preceding detailed description. It is intended that the present disclosure be construed as including all such modifications and alterations insofar as they come within the scope of the appended claims or the equivalents thereof.

What is claimed is:

1. An aqueous oleanolic acid solution, consisting of:
    from about 0.10 weight % to about 2.5 weight % oleanolic acid, based on a total weight of the aqueous oleanolic acid solution;
    from about 60 weight % to about 90 weight % solvent, based on the total weight of the aqueous oleanolic acid solution;
    from greater than 20 weight % to about 35 weight % solubility agent, based on the total weight of the aqueous oleanolic acid solution, and
    optionally, one or more oral care agents,
    wherein the solvent consists of water, wherein the solubility agent consists of sodium lauryl sulfate (SLS), and wherein the aqueous oleanolic acid solution is substantially free of ethanol and dimethyl sulfoxide (DMSO), wherein the aqueous oleanolic acid solution is a clear solution.

2. The aqueous oleanolic acid solution of claim 1, comprising:

from greater than 20 weight % to about 35 weight % SLS, based on the total weight of the aqueous oleanolic acid solution; and from about 60 weight % to about 80 weight % water, based on the total weight of the aqueous oleanolic acid solution.

3. The aqueous oleanolic acid solution of claim 1, comprising:

SLS and water at a weight ratio of from about 2.7:5 to about 1.6:5.

4. An aqueous oleanolic acid solution, consisting of:

a first oleanolic acid solution; and a second oleanolic acid solution, wherein the first oleanolic acid solution is substantially free of ethanol and DMSO, wherein the first oleanolic acid solution consists of:

from about 0.10 weight % to about 2.5 weight % oleanolic acid, based on a total weight of the first oleanolic acid solution, from about greater than 20 weight % to about 35 weight % SLS, based on the total weight of the first oleanolic acid solution, and from about 60 weight % to about 90 weight % water, based on the total weight of the first oleanolic acid solution, and wherein the second oleanolic acid solution consists of:

from about 0.10 weight % to about 0.25 weight % oleanolic acid, based on a total weight of the second oleanolic acid solution, and from about 2.0 weight % to about 8.0 weight % flavorant, based on a total weight of the aqueous oleanolic acid solution, and wherein the aqueous oleanolic acid solution is a clear solution.

5. The aqueous oleanolic acid solution of claim 4, wherein the flavorant comprises one or more of menthol, menthyl acetate, menthyl lactate, camphor, peppermint oil, eucalyptus oil, eucalyptol, anethole, eugenol, cassia, oxanone, x-irisone, propenyl guaiethol, thymol, linalool, benzaldehyde, cinnamaldehyde, N-ethyl-p-menthan-3-carboxamine, N,2,3-trimethyl-2-isopropylbutanamide, 3-1-menthoxypropane-1,2-diol, cinnamaldehyde glycerol acetal (CGA), methone glycerol acetal (MGA) or combinations or mixtures thereof.

6. A method of making an oral care composition incorporating oleanolic acid according to claim 1, comprising:

combining an aqueous oleanolic acid solution with one or more oral care ingredients to make an oral care composition, wherein the oral care composition comprises from about 0.01 weight % to about 25 weight % oleanolic acid, based on a total weight of the oral care composition.

7. The method of claim 6, wherein the aqueous oleanolic acid solution comprises:

from about 0.10 weight % to about 2.5 weight % oleanolic acid, based on a total weight of the aqueous oleanolic acid solution, from about 60 weight % to about 90 weight % solvent, based on the total weight of the aqueous oleanolic acid solution, and from about 20 weight % to about 35 weight % solubility agent, based on the total weight of the aqueous oleanolic acid solution, wherein the solvent comprises water, and wherein the solubility agent comprises sodium lauryl sulfate (SLS).

8. The method of claim 6, wherein the aqueous oleanolic acid solution comprises:

from about 20 weight % to about 35 weight % SLS, based on the total weight of the aqueous oleanolic acid solution, and from about 60 weight % to about 90 weight % water, based on the total weight of the aqueous oleanolic acid solution.

9. The method of claim 6, wherein the one or more oral care ingredients comprise one or more of a carrier, a humectant, surfactants, polymers, thickeners, antioxidants, preservatives, flavoring agents, sweeteners, colorants, pH modifiers, anti-calculus agents, and fluoride sources, or combinations thereof, and wherein the one or more oral care ingredients are orally acceptable.

10. The method of claim 6, wherein the aqueous oleanolic acid solution lacks any other solubility agent, except for SLS or flavorant.

11. An oral care composition, comprising:

an aqueous oleanolic acid solution; and one or more oral care ingredients, wherein the oral care composition comprises from about 0.01 weight % to about 0.25 weight % oleanolic acid, based on a total weight of the oral care composition, and wherein the aqueous oleanolic acid solution is substantially free of ethanol and DMSO; and wherein the aqueous oleanolic acid solution is a clear solution, and wherein the aqueous oleanolic acid solution comprises:

a first oleanolic acid solution; and a second oleanolic acid solution, wherein the first oleanolic acid solution consists of:

from about 0.10 weight % to about 2.5 weight % oleanolic acid, based on a total weight of the first oleanolic acid solution, from greater than 20 weight % to about 35 weight % SLS, based on the total weight of the first oleanolic acid solution, and from about 60 weight % to about 90 weight % water, based on the total weight of the first oleanolic acid solution, and wherein the second oleanolic acid solution consists of:

from about 0.01 weight % to about 0.25 weight % oleanolic acid, based on a total weight of the second oleanolic acid solution, and from about 2.0 weight % to about 8.0 weight % flavorant, based on a total weight of the aqueous oleanolic acid solution.

* * * * *